United States Patent
Li et al.

(10) Patent No.: US 11,249,663 B2
(45) Date of Patent: Feb. 15, 2022

(54) I/O REQUEST PROCESSING METHOD AND DEVICE

(71) Applicant: HUAWEI TECHNOLOGIES CO., LTD., Shenzhen (CN)

(72) Inventors: Langbo Li, Chengdu (CN); Mingqian Zhang, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/026,280

(22) Filed: Sep. 20, 2020

(65) Prior Publication Data

US 2021/0004171 A1 Jan. 7, 2021

Related U.S. Application Data

(63) Continuation of application No. PCT/CN2018/095992, filed on Jul. 17, 2018.

(51) Int. Cl.
*G06F 3/06* (2006.01)

(52) U.S. Cl.
CPC ............ *G06F 3/0635* (2013.01); *G06F 3/067* (2013.01); *G06F 3/0611* (2013.01); *G06F 3/0653* (2013.01); *G06F 3/0659* (2013.01); *G06F 3/0665* (2013.01); *G06F 3/0679* (2013.01)

(58) Field of Classification Search
CPC ............................................... G06F 3/06–0689
See application file for complete search history.

(56) References Cited

U.S. PATENT DOCUMENTS

| | | | |
|---|---|---|---|
| 8,145,842 B2* | 3/2012 | Shiga | G06F 3/0608 711/114 |
| 2002/0016792 A1* | 2/2002 | Ito | G06F 11/201 |
| 2005/0268147 A1* | 12/2005 | Yamamoto | G06F 11/0727 714/2 |

(Continued)

FOREIGN PATENT DOCUMENTS

| | | |
|---|---|---|
| CN | 102650932 A | 8/2012 |
| CN | 102968422 A | 3/2013 |

(Continued)

OTHER PUBLICATIONS

Nvm Express et al.,"11NVM Express 1.3",May 1, 2017, total 282 pages.

(Continued)

*Primary Examiner* — Nicholas J Simonetti

(57) ABSTRACT

A host and a storage system communicate with each other by using a NVMeoF protocol are provided. In some embodiments, the host accesses a logical disk of the host by using a control node in the storage system, and sends a state query command to the control node. The state query command is configured to instruct the control node to report a path state of a path corresponding to the control node. Still in those embodiments, the host receives the path state reported by the control node. When the received path state indicates that the logical disk includes an access interval, the host sends an interval query command to the control node; receives access interval information reported by the control node; and records a mapping relationship between the control node and the access interval information.

26 Claims, 11 Drawing Sheets

(56) References Cited

U.S. PATENT DOCUMENTS

| | | | | |
|---|---|---|---|---|
| 2007/0277011 A1* | 11/2007 | Tanaka | ............ | G06F 3/0611 |
| | | | | 711/162 |
| 2008/0235467 A1* | 9/2008 | Tagawa | ............ | G06F 12/0246 |
| | | | | 711/154 |
| 2011/0264854 A1* | 10/2011 | Ouchi | ............ | G06F 3/0616 |
| | | | | 711/114 |
| 2011/0268435 A1* | 11/2011 | Mizutani | ............ | H04Q 11/0067 |
| | | | | 398/5 |
| 2014/0013064 A1* | 1/2014 | Yoshida | ............ | G06F 3/0625 |
| | | | | 711/154 |
| 2015/0012735 A1 | 1/2015 | Tamir et al. | | |
| 2017/0083417 A1* | 3/2017 | Kawaguchi | ............ | G06F 3/0619 |
| 2017/0153832 A1 | 6/2017 | Amann et al. | | |
| 2019/0294379 A1 | 9/2019 | Xiong | | |
| 2019/0354302 A1* | 11/2019 | Enz | ............ | G06F 3/0622 |

FOREIGN PATENT DOCUMENTS

| | | | |
|---|---|---|---|
| CN | 103019622 A | 4/2013 |
| CN | 105138292 A | 12/2015 |
| CN | 105677703 A | 6/2016 |
| CN | 106815338 A | 6/2017 |
| CN | 107329859 A | 11/2017 |
| CN | 107665091 A | 2/2018 |
| CN | 108228076 A | 6/2018 |
| JP | 2018045688 A | 3/2018 |
| KR | 20120094375 A | 8/2012 |
| KR | 20170134704 A | 12/2017 |
| WO | 2017040706 A1 | 3/2017 |
| WO | 2017131724 A1 | 8/2017 |
| WO | 2018108072 A1 | 6/2018 |

OTHER PUBLICATIONS

Revision 1.0 Nvm Express, "NVM Express over Fabrics", Jun. 5, 2016, total 49 pages.

Extended European Search Report issued in EP 18926874.1, dated May 19, 2021, total 13 pages.

Notice of Reasons for Rejection issued in JP 2020-529744, dated Oct. 4, 2021 with English Translation, 5 pages.

Notice of Allowance issued in KR1 0-2020-7014420, dated Nov. 30, 2021, 2 pages.

* cited by examiner

| Bit | Description |
|---|---|
| 31:28 | ... |
| 27:16 | ... |
| 15 | ... |
| 14:12 | ... |
| 11:08 | ... |
| 07:00 | OCh (log page identifier) |

FIG. 6

| Bytes | Description |
|---|---|
| 03:00 | ... |
| 07:04 | 1 |
| 15:08 | ... |
| 16 | 02h |
| 32:17 | ... |
| 35:32 | ... |
| 39:36 | ... |
| ... | ... |

FIG. 7

| Value | Description |
|---|---|
| 01h | ANA optimized state (optimized state) |
| 02h | ANA non-optimized state (non-optimized state) |
| 03h | ANA inaccessible state (inaccessible state) |
| 04h | ANA persistent loss state (persistent loss state) |
| 05h | ANA LBA-dependent state (space-dependent state) |

FIG. 8

| Bytes | Description |
|---|---|
| 03:00 | ... |
| 07:04 | 1 |
| 15:08 | ... |
| 16 | 05h |
| 32:17 | ... |
| 35:32 | ... |
| 39:36 | ... |
| ... | ... |

FIG. 9

| Bit | Description |
|---|---|
| 31:28 | ... |
| 27:16 | ... |
| 15 | ... |
| 14:12 | ... |
| 11:08 | ... |
| 07:00 | 0Dh |

FIG. 10

| Bytes | Description |
|---|---|
| 03:00 | ... |
| 07:04 | Namespace 1 |
| 11:08 | 1 |
| 27:12 | Access interval description (user data segment descriptor 1) |
| ... | ... |

FIG. 11

| Bytes | Description |
|---|---|
| 07:00 | XXXX |
| 11:08 | XXXX |
| 15:12 | 0 |

FIG. 12

| Bytes | Description |
|---|---|
| 07:00 | XXXX |
| 11:08 | XXXX |
| 15:12 | XXXX |

I/O REQUEST PROCESSING METHOD AND DEVICE

CROSS-REFERENCE TO RELATED APPLICATIONS

This application is a continuation of International Application No. PCT/CN2018/095992, filed on Jul. 17, 2018, the disclosure of which is hereby incorporated by reference in its entirety.

TECHNICAL FIELD

This application relates to the storage field, and in particular, to an I/O request processing method and a device.

BACKGROUND

In an existing storage architecture based on the NVMe over Fabrics (NVMeoF) protocol, a storage system includes a plurality of control nodes and a logical disk (for example, Namespace). A host accesses a logical disk by using the plurality of control nodes, and therefore there are a plurality of paths between the host and the logical disk. The host selects a path through polling, to deliver an I/O request to the storage system. A control node that is in the storage system and that receives the I/O request calculates, based on a logical address carried in the I/O request and according to a specific algorithm, a control node that executes the I/O request. For example, the host delivers the I/O request to a first control node by using a first path in the plurality of paths. The first control node learns, by performing calculation based on the logical address in the I/O request and according to a preset algorithm, that the I/O request needs to be executed by a second control node, and the first control node forwards the I/O request to the second control node. Consequently, the forwarding of the I/O request increases an I/O delay.

SUMMARY

Embodiments in accordance with the present disclosure provide an I/O request processing method, a device, and a host, to set an access interval for each control node in a storage system.

A first aspect of the embodiments provides a data processing method performed by a host. The host and a storage system communicate with each other by using the NVMeoF protocol. The storage system includes a logical disk, and the host accesses the logical disk by using a control node in the storage system. The method includes: sending, by the host, a state query command to the control node, where the state query command is used to instruct the control node to report a path state of a path corresponding to the control node; then receiving the path state reported by the control node; when the path state received by the host indicates that the logical disk includes an access interval, sending an interval query command to the control node; then receiving access interval information reported by the control node; and recording a mapping relationship between the control node and the access interval information, where an access interval indicated by the access interval information is pre-allocated to the control node.

An access interval that is set by the storage system for each control node is obtained by using the state query command of the NVMeoF protocol and the newly-added interval query command. In this way, when an I/O request is received subsequently, the I/O request may be delivered, based on a access interval corresponding to a logical address in the I/O request, to a controller corresponding to the access interval, thereby avoiding forwarding of the I/O request.

In one example design, the method further includes: receiving an I/O request, where the I/O request carries a logical address of to-be-accessed data; determining an access interval corresponding to the logical address; determining, based on the mapping relationship, a control node corresponding to the access interval; and sending the I/O request to the control node corresponding to the access interval.

The host records the mapping relationship between the control node and the access interval information, and therefore when receiving the I/O request, the host may deliver, based on the access interval corresponding to the logical address in the I/O request, the I/O request to the control node corresponding to the access interval, thereby avoiding forwarding of the I/O request.

In one example design, when determining that the logical disk includes the access interval, the control node reports, to the host, the path state indicating that the logical disk includes the access interval.

The path state indicating that the logical disk includes the access interval is added to the NVMeoF protocol, so that the host can determine, based on the path state, whether to query a access interval.

In one example design, the access interval query command is defined according to a command Get Log Page command Dword 10 in the NVMeoF protocol, and a command identifier of the access interval query command is added to a log page identifier field of the command.

The interval query command is defined by using the command in the existing NVMeoF protocol, and the existing NVMeoF protocol does not need to be modified.

In one example design, the access interval indicated by the access interval information is a contiguous address space.

In one example design, the access interval information includes an access interval starting address and an access interval length.

In one example design, the access interval corresponding to the control node includes a first access sub-interval and a second access sub-interval, and there is a spacing between the first access sub-interval and the second access sub-interval.

In one example design, the first access sub-interval is adjacent to the second access sub-interval, and the access interval information includes an access interval starting address, a length of each access sub-interval, and a spacing between two adjacent access sub-intervals.

In one example design, the access interval information is reported to the host by using response information that is defined for the access interval query command, and the access interval information is added to an interval description field of the response information.

A second aspect of the present disclosure provides a data processing method, and the method is performed by a control node in a storage system. The storage system and a host communicate with each other by using the NVMeoF protocol, and the storage system includes a logical disk. The method includes: receiving a state query command sent by the host, where the state query command is used to instruct the control node to report a path state of a path corresponding to the control node; when the logical disk includes an access interval, reporting, to the host, a path state indicating that the logical disk includes the access interval; receiving an access interval query command sent by the host based on the path state; and reporting, to the host based on the interval query information, access interval information of an access interval allocated to the control node, so that the host records a mapping relationship between the access interval information and the control node.

An access interval that is set by the storage system for each control node is obtained by using the state query command of the NVMeoF protocol and the newly-added interval query command. In this way, when an I/O request is received subsequently, the I/O request may be delivered, based on a access interval corresponding to a logical address in the I/O request, to a control node corresponding to the access interval, thereby avoiding forwarding of the I/O request.

Various example designs of the second aspect of the embodiments of the present disclosure are basically the same as various possible designs of the first aspect, and details are not described herein again.

A third aspect of the present disclosure provides a data processing method performed by a host. The host is connected to a storage system. The storage system includes a plurality of control nodes, and the host accesses a logical disk in the storage system by using the plurality of control nodes. The method includes: receiving an I/O request, where the I/O request carries a logical address of to-be-accessed data; determining an access interval corresponding to the logical address, where the logical disk includes a plurality of access intervals, and the host records a mapping relationship between each access interval and a control node; and delivering the I/O request to a control node corresponding to the determined access interval.

An access interval is set for each control node in the storage system. When an I/O request is received, the I/O request may be delivered, based on a access interval corresponding to a logical address in the I/O request, to a control node corresponding to the access interval, thereby avoiding forwarding of the I/O request.

In one example design, the method further includes: sending a state query command to the plurality of control nodes, where the state query command is used to instruct each of the plurality of control nodes to report a path state of a path corresponding to the control node;

receiving the path states reported by the plurality of control nodes; when the received path state indicates that the logical disk includes an access interval, sending an interval query command to a control node that reports the path state; receiving access interval information reported by the control node that reports the path state; and recording a mapping relationship between the access interval information and the control node that reports the path state.

An access interval that is set by the storage system for each control node is obtained by using the state query command of the NVMeoF protocol and the newly-added interval query command, so that the host may deliver, based on a access interval corresponding to a logical address in an I/O request, the I/O request to a control node corresponding to the access interval, thereby avoiding forwarding of the I/O request.

In one example design, when determining that the logical disk includes the access interval, the control node that receives the state query command reports, to the host, the path state indicating that the logical disk includes the access interval.

The path state indicating that the logical disk includes the access interval is added to the NVMe protocol, so that the host can determine, based on the path state, whether to query a access interval.

Other example designs of this embodiment are the same as several possible designs of the first aspect, and details are not described herein again.

A fourth aspect the present disclosure provides a data processing method performed by a host. The host and a storage system communicate with each other by using an external network. The method includes: encapsulating a non-volatile memory express NVMe interval query command into the external network protocol to obtain an external network protocol interval query command, where the NVMe interval query command is used to query an access interval allocated to a control node in the storage system, and the access interval belongs to a namespace of the storage system; sending the external network protocol interval query command to the control node; receiving an external network protocol interval response message sent by the control node, where the external network protocol interval response message includes a response to the NVMe interval query command, and the response to the NVMe interval query command includes access interval information of the namespace; parsing the external network protocol interval response message to obtain response information of the NVMe interval query command; and obtaining, from the response to the NVMe interval query command, access interval information of the control node and recording the access interval information.

An access interval that is set by the storage system for each control node is obtained by using the newly-added interval query command of the NVMeoF protocol. In this way, when an I/O request is received subsequently, the I/O request may be delivered, based on a access interval corresponding to a logical address in the I/O request, to a control node corresponding to the access interval, thereby avoiding forwarding of the I/O request.

In one example design, before the encapsulating a non-volatile memory express NVMe interval query command into the external network protocol to obtain an external network protocol interval query command, the method further includes:

encapsulating an NVMe state query command into the external network protocol to obtain an external network protocol state query command, where the NVMe state query command is used to query a path state of a path corresponding to the control node;

sending the external network protocol state query command to the control node;

receiving an external network protocol state response message sent by the control node, where the external network protocol state response message includes a response to the NVMe state query command, the Response to the NVMe state query command includes path state information, and the path state information indicates that the namespace includes an access interval; and parsing the external network protocol state response message to obtain response information of the NVMe state query command.

The path state information may be reported to the host by using the NVMe state query command, so that the host can determine, based on the path state information, whether an access interval is allocated for the logical disk.

Other example implementations of this embodiment of the present disclosure are the same as the possible implementations of the first aspect, and details are not described herein again.

A fifth aspect of the present disclosure provides a data processing method performed by a control node in a storage system. The host and the storage system communicate with each other by using an external network. The method includes: receiving an external network protocol interval query command sent by the host, and parsing the external network protocol interval query command to obtain an NVMe interval query command; generating response information of the NVMe interval query command, where the response information of the NVMe interval query command includes access interval information corresponding to the control node, and encapsulating the NVMe interval query command into the external network protocol to obtain an external network protocol interval query command; and reporting the external network protocol interval query command to the host.

An access interval that is set by the storage system for each control node is obtained by using the newly-added interval query command of the NVMeoF protocol. In this way, when an I/O request is received subsequently, the I/O request may be delivered, based on a access interval corresponding to a logical address in the I/O request, to a control corresponding to the access interval, thereby avoiding forwarding of the I/O request.

In one example design, before the receiving an external network protocol interval query command sent by the host, the method further includes: receiving an external network protocol state query command, and parsing the external network protocol state query command to obtain a non-volatile memory express NVMe state query command, where the NVMe state query command is used to instruct the control node to report a path state of a path corresponding to the control node; generating response information of the NVMe state query command, and when the namespace includes an access interval, adding a path state indicating that the namespace includes the access interval to the response information of the NVMe state query command; and encapsulating the NVMe state query command to obtain response information of the external network protocol state query command, and reporting the response information of the external network protocol state query command to the host.

The path state information may be reported to the host by using the NVMe state query command, so that the host can determine, based on the path state information, whether an access interval is created for the logical disk.

Other example implementations of this embodiment of the present disclosure are the same as the possible implementations of the first aspect, and details are not described herein again.

According to a sixth aspect, an embodiment in accordance with the present disclosure further provides a host. The host and a storage system communicate with each other by using the NVMeoF protocol, the storage system includes a logical disk, the host accesses the logical disk by using a control node in the storage system, and the host further includes units or means configured to perform steps in the first aspect.

According to a seventh aspect, an embodiment of the present disclosure further provides a control node in a storage system. A host and the storage system communicate with each other by using the NVMeoF protocol, the storage system includes a logical disk, the host accesses the logical disk by using the control node in the storage system, and the host further includes units or means configured to perform steps in the second aspect.

According to an eighth aspect, an embodiment in accordance with the present disclosure further provides a host. The host and a storage system communicate with each other by using the NVMeoF protocol, the storage system includes a logical disk, the host accesses the logical disk by using a control node in the storage system, and the host includes units or means configured to perform steps in the third aspect.

According to a ninth aspect, an embodiment in accordance with the present disclosure further provides a host. The host and a storage system communicate with each other by using an external network, and the host includes units or means configured to perform steps in the fourth aspect.

According to a tenth aspect, an embodiment in accordance with the present disclosure further provides a control node in a storage system. A host and the storage system communicate with each other by using an external network, and the control node includes units or means configured to perform steps in the fifth aspect.

According to an eleventh aspect, an embodiment in accordance with the present disclosure further provides a host. The host and a storage system communicate with each other by using the NVMeoF protocol. The storage system includes a logical disk. The host accesses the logical disk by using a control node in the storage system. The host includes a memory and a processor. The memory is configured to store a program and data. The processor is configured to: run the program stored in the memory, and perform, based on the data stored in the memory, the method provided in the first aspect, the third aspect, or the fourth aspect.

According to a twelfth aspect, an embodiment in accordance with the present disclosure further provides a control node in a storage system. A host and the storage system communicate with each other by using the NVMeoF protocol. The storage system includes a logical disk. The host accesses the logical disk by using the control node in the storage system. The control node includes a memory and a processor. The memory is configured to store a program and data. The processor is configured to run the program stored in the memory, and perform, based on the data stored in the memory, the method provided in the second aspect or the fifth aspect.

BRIEF DESCRIPTION OF DRAWINGS

FIG. 6 is a schematic diagram of a path state query command according to an embodiment of the present disclosure;

FIG. 7 is a schematic diagram of state reporting information according to an embodiment of the present disclosure;

FIG. 8 is a schematic diagram of path states defined in the NVMeoF protocol according to an embodiment of the present disclosure;

FIG. 9 is a schematic diagram in which a space-dependent state is carried in state reporting information according to an embodiment of the present disclosure;

FIG. 10 is a schematic diagram of an interval query command according to an embodiment of the present disclosure;

FIG. 11 is a schematic diagram of interval reporting information according to an embodiment of the present disclosure;

FIG. 12 and FIG. 13 are respectively a schematic diagram in which interval reporting information carries interval description information of an access interval whose address space is contiguous and a schematic diagram in which interval reporting information carries interval description information of an access interval whose address space is non-contiguous according to an embodiment of the present disclosure;

FIG. 14 is a flowchart of allocating a control node for executing an I/O request according to an embodiment of the present disclosure;

DESCRIPTION OF EMBODIMENTS

Figure 1:
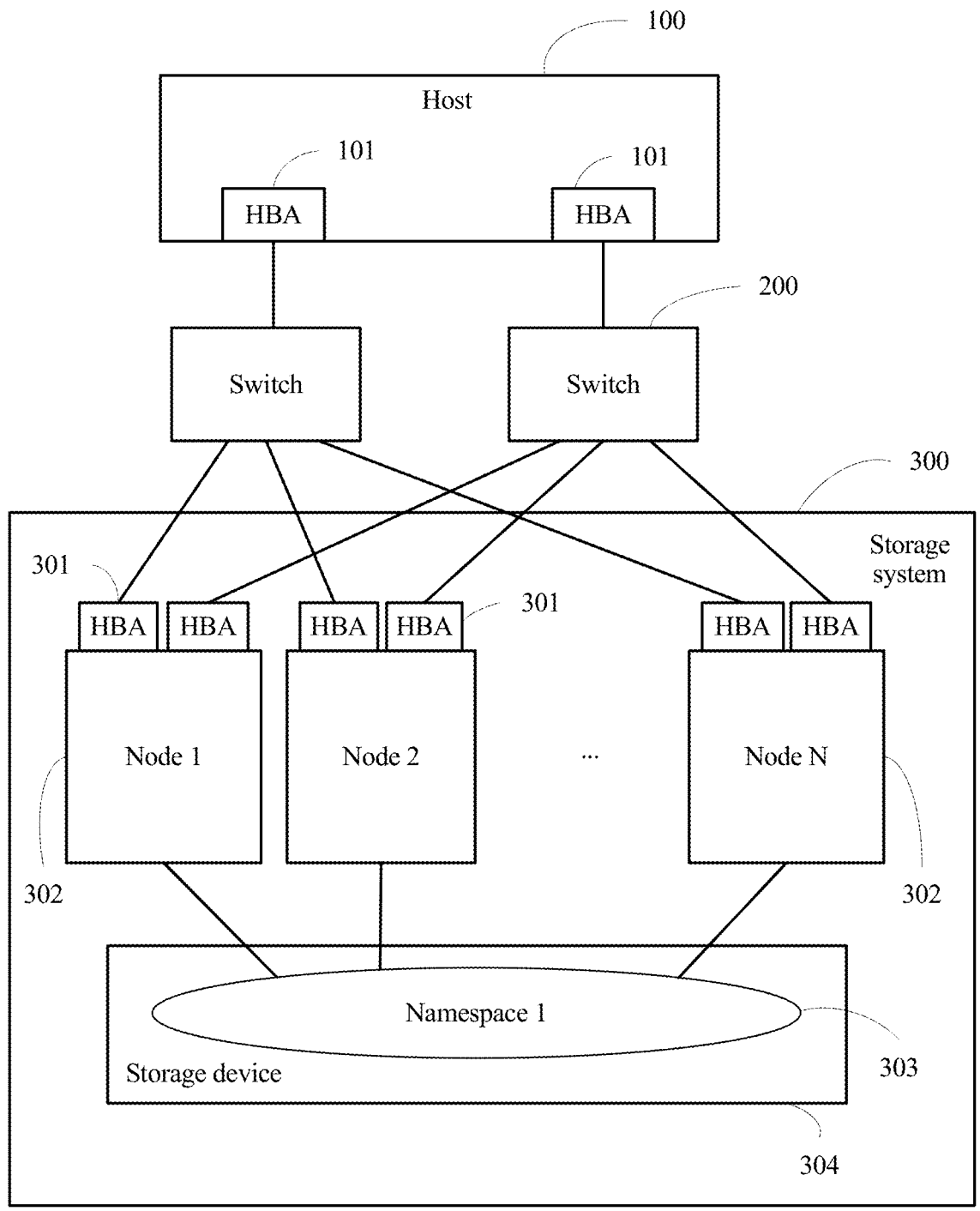
FIG. 1 is an architectural diagram of a system to which an embodiment of the present disclosure is applied.

FIG. 1 is an architectural diagram of a system to which an embodiment in accordance with the present disclosure is applied. A host 100 is connected to two switches 200 by using two host ports such as host bus adapters (HBA) 101. The two switches 200 are both connected to a storage system 300. The two switches 200 and the two host ports 101 are disposed to prevent a channel from being broken when one of the two switches 200 or one of the two host ports is faulty.

The storage system 300 includes a plurality of control nodes 302 such as nodes 1 to N. Each control node 302 is connected to the two switches 200 by using two storage ports 301 (for example, HBA cards). In this way, there are two paths between the host and each control node 302. The two paths are redundant to each other. If one of the paths is faulty, the other path may be used to transmit data between the host 100 and the control node 302. The storage system 300 includes a storage device 304 constituted by a plurality of SSDs. The storage device 304 may be a redundant array of independent disks (RAID) or a just a bunch of flash. In some embodiments, the storage device 304 further includes a virtual SSD. The virtual SSD is obtained by mapping, to the storage device 304, another storage device that communicates with the storage device 304 by using the NVMeoF protocol. Mapping a remote SSD to a local storage device by using the NVMeoF protocol and using the SSD as a virtual SSD of the local storage device relate to the prior art, and details are not described herein. The host 100 and the storage system 300 communicate with each other by using the NVMeoF protocol.

A local SSD and/or a virtual SSD in the storage device 304 may be used to create a logical disk 303. The logical disk 303 may be a namespace (Namespace), and the namespace is a means of expression for a logical disk defined in the NVMeoF protocol. FIG. 1 shows only one logical disk 303. However, in actual application, a plurality of logical disks may be created in the storage device 304. One logical disk may be allocated to a plurality of hosts for use or a plurality of logical disks may be allocated to one host for use.

Figure 2:
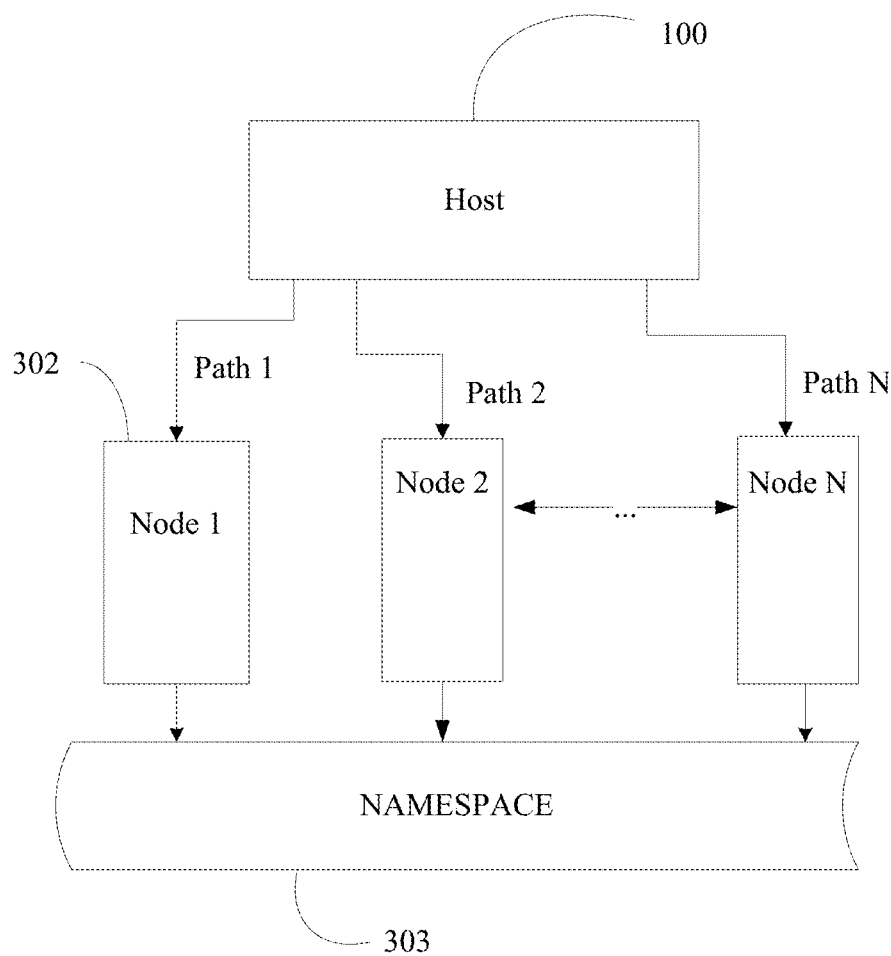
FIG. 2 is a schematic diagram of N paths used by a host to access a logical disk in a storage system according to an embodiment of the present disclosure.

In this embodiment, as shown in FIG. 1, the host 100 may access, by using the N control nodes 302, the logical disk 303 allocated to the host 100. To facilitate description of a path between the host 100 and the logical disk 303, in FIG. 2, a physical link between the host 100 and the logical disk in FIG. 1 is omitted, and two redundant paths passing through a same control node are combined into one path to obtain N paths used by the host 100 to access the logical disk 303.

In the storage system 300, any control node 302 specified by a user may create and manage the logical disk 303. Herein, it is assumed that a control node specified by the user is the node 1. After the logical disk 303 is created, the node 1 allocates a disk identifier (ID) and a disk code to the logical disk 303. The disk identifier may uniquely identify the logical disk. For example, the disk identifier includes a globally unique identifier (GUID) applied to the NVMeoF protocol, manufacturer information, and product information. The disk code is used to distinguish between different logical disks created in the storage device 304. For example, the disk code of the logical disk 303 may be represented as a namespace 1.

After the disk identifier and the disk code of the logical disk 303 are allocated, the node 1 allocates a virtual host to the logical disk 303. For example, the node 1 allocates a virtual host 1 to the logical disk 303, and records a mapping relationship between the logical disk 303 and the virtual host as follows: virtual host 1: namespace 1.

After the disk identifier and the disk code of the logical disk 303 are allocated, the node 1 may configure a control node that accesses the logical disk 303. For example, N control nodes are configured for the logical disk 303. To distinguish between the control nodes 302, the storage system 300 allocates a unique identifier to each control node 302, that is, a node identifier. The control nodes configured for the logical disk 303 may be represented by using the following mapping relationship: namespace 1: node 1, node 2, . . . , node N.

Figure 3A:
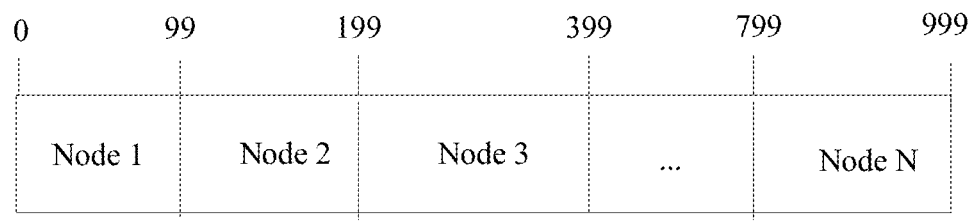
FIG. 3a and FIG. 3b are respectively a schematic diagram of dividing an address space of a logical disk in a storage system into N contiguous address spaces and a schematic diagram of dividing an address space of a logical disk in the storage system into N non-contiguous address spaces according to an embodiment of the present disclosure.

In this embodiment, for each control node 302, the node 1 may further set an access interval accessible to the control node 302. FIG. 3a is a schematic diagram of dividing an address space of the logical disk 303 into N contiguous address spaces by the node 1. For example, if the logical disk 303 has a storage space of 1 GB, an interval allocated to the node 1 is 0 to 99 MB, an interval allocated to the node 2 is 100 to 199 MB, an interval allocated to the node 3 is 200 to 399 MB, . . . , and an interval allocated to the node N is 800 to 1023 MB. Each access interval is a contiguous address space, and access intervals may have a same size or different sizes.

Figure 3B:
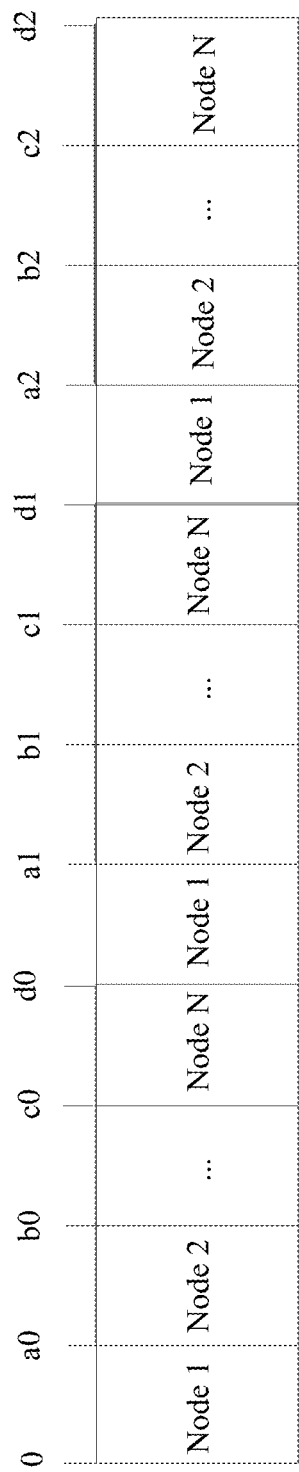

In another embodiment, an access interval allocated by the node 1 to each control node is non-contiguous. As shown in FIG. 3b, the node 1 first divides an address space of the logical disk 303 into at least two address sub-spaces with equal sizes, and then divides each address sub-space into N access sub-intervals. Each access sub-interval corresponds to one control node. The address sub-spaces are divided in a same manner. For example, in each address sub-space, access sub-intervals corresponding to a same control node have a same size and a same order in the address sub-space. A set of access sub-intervals corresponding to each control node constitutes an access interval of the control node. For example, if the logical disk 303 is divided into three address sub-spaces, an access interval of the node 1 is 0 to a0, d0+1 to a1, and d1+1 to a2; an access interval of the node 2 is a0+1 to b0, a1+1 to b1, and a2+1 to b2; and an access interval of the node N is c0+1 to d0, c1+1 to d1, and c2+1 to d2. Access sub-intervals of an access interval corresponding to each node have a same size and a same spacing. During recording of the access interval allocated to each control node, the following may be recorded: a starting address of the access interval, an address length of an access sub-interval constituting the access interval, an address spacing between access sub-intervals, and a quantity of access sub-intervals constituting the access interval. After access intervals are allocated to the N control nodes 302, in response to a request of the host, the N control nodes 302 report respective access intervals corresponding to the control nodes 302 to the host 100, and the host may deliver an I/O request based on the access intervals. A method for reporting the access interval is described below. In this embodiment of the present disclosure, if a logical disk other than the logical disk 303 is further created in the storage device 304, based on an actual requirement, the allocation of the an access interval for the another logical disk based on an actual requirement.

As shown in FIG. 1, when the N control nodes are connected to the host port 101 by using the storage port 301 and the switch 200, each control node 302 may obtain an identifier of the host port 101 connected to the control node 302, then replace a mapping relationship between a virtual host and a disk code of the logical disk 303 with a mapping relationship between a host port identifier and the disk code of the logical disk. The replaced mapping relationship may be represented as: HBA 1, HBA 2 (virtual machine 1): namespace 1. In this embodiment of the present disclosure, for the purpose of redundancy, the host 100 is connected to the storage system 300 by using the two host ports 101, and therefore the two identifiers: HBA 1 and HBA 2, of two host ports are recorded in the mapping relationship.

The generated various mapping relationships, for example, the mapping relationship between the disk code of the logical disk and node identifiers of the N control nodes 302, the mapping relationship between the host port identifier and the disk code of the logical disk, and a mapping relationship between an identifier of each control node and an access interval, may be stored in a storage region accessible to all the N control nodes 302.

Figure 4:
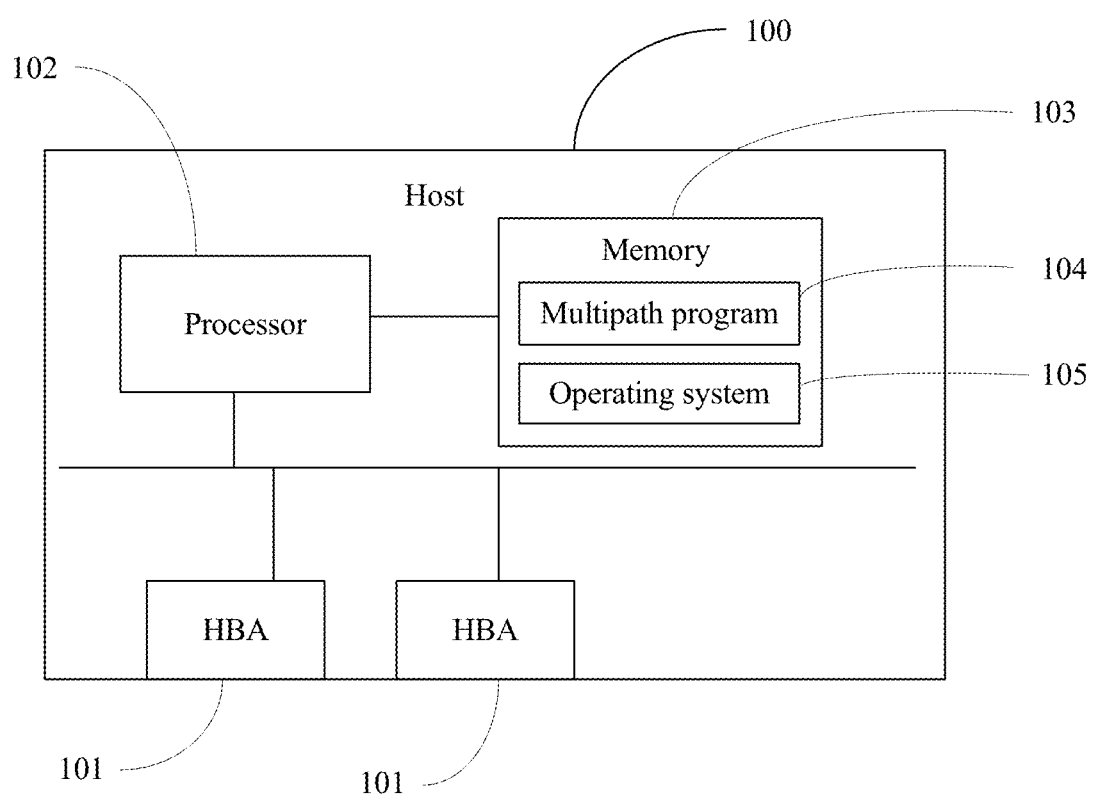
FIG. 4 is an architectural diagram of a host according to an embodiment of the present disclosure.

FIG. 4 is an architectural diagram of a host 100 according to an embodiment in accordance with the present disclosure. In addition to the two host ports 101, the host 100 further includes a processor 102 and a memory 103, and the memory 103 stores a multipath program 104 and an operating system 105. The processor 102 executes the operating system 105 and the multipath program 104, so that the host 100 manages the plurality of paths used for accessing the logical disk 303. That the host 100 manages the plurality of paths used for accessing the logical disk 303 is described below by using a flowchart shown in FIG. 5.

Step S501: When the operating system 105 of the host 100 detects that the storage system 300 is connected to the host 100, the operating system 105 separately sends a disk reporting command to the storage system 300 by using the plurality of paths between the host 100 and the storage system 300 (that is, the plurality of paths between the storage port 301 of the N control nodes and the host port 101). When the disk reporting command passes through the host port 101, an identifier of the host port is added to the disk reporting command.

Step S502: After each control node 302 in the storage system 300 receives the disk reporting command, the control node 302 obtains the identifier of the host port in the disk reporting command, and determines, based the identifier of the host port and a mapping relationship between a host port identifier and a disk code of a logical disk, a disk code corresponding to the identifier of the host port.

Step S503: Each control node 302 in the storage system 300 generates reporting information for a logical disk corresponding to the disk code, adds the disk code to the reporting information, and reports the information to the host 100. A process of reporting the reporting information is described below by using a node 1 as an example. The node 1 is connected to two HBA cards of the host by using two HBA cards, and therefore there are two paths between the node 1 and the host. When receiving two disk reporting commands by using the two HBA cards, the node 1 obtains identifiers of the two HBA cards from the two disk reporting commands, and then obtains a same disk code based on the identifiers of the two HBA cards. After obtaining the disk code, the node 1 may report the disk code to the host 100 by using each of the two paths between the node 1 and the host 100.

As stipulated in the NVMeoF protocol, in the process of reporting the reporting information, an identifier of a control node that reports the reporting information, and the storage port 301 (for example, the two HBA ports of the node 1) and the host port 101 through which the reporting information passes are added to the reporting information. In this way, a controller identifier, the storage port, the host port, and the disk code in the reporting information are used to represent a path used for reporting the disk code.

Step S504: After receiving the information reported by each control node 302 in the storage system 300, the multipath program 104 of the host 100 sends a disk identifier query command by using a path indicated by path information in each piece of reporting information, where the query command includes the disk code in the reporting information.

Step S505: After receiving the query command, each control node 302 in the storage system 300 obtains, based on the disk code in the query command, a disk identifier corresponding to the disk code.

Step S506: Each control node 302 in the storage system 300 reports, by using a path used for sending the query command, the disk identifier corresponding to the disk code. When creating the logical disk 303, the storage system 300 allocates a disk identifier and a disk code to each logical disk 303, and therefore after receiving the disk code, the storage system 300 may obtain the disk identifier based on the disk code.

Step 507: The multipath program 104 of the host 100 determines, based on the reported disk identifier, a path used for accessing the logical disk corresponding to the disk identifier, and manages the determined path.

For example, when receiving a disk identifier for the first time, the multipath program 104 creates a disk object based on the disk identifier, allocates a disk object name to the disk object, establishes a mapping relationship between the disk object name and the disk identifier, and records, as a path of the disk object, a path used for reporting the disk identifier. Further, the multipath program 104 may further record other related information such as an address space and a capacity size of the disk in the disk object. If the multipath program 104 receives a same disk identifier subsequently, the multipath program 104 may record, as another path of the disk object, a path used for reporting the disk identifier subsequently.

In this embodiment in accordance with the present disclosure, to ensure reliability, a redundant path is set between each control node 302 and the host 100. When the multipath program manages a path used for accessing each logical disk 303, redundant paths between the host 100 and all the control nodes 302 are combined into one path. During combination, paths of a same control node may be recorded together based on an identifier of the control node. In this way, the host selects one of the redundant paths to deliver an I/O request, and if one path is faulty, the host selects another path to replace the faulty path to deliver the I/O request. For ease of description, the combined path is used for description in the following. In other words, a case in which there is only one path between each control node 302 and the host 100 is used for description.

In this way, the multipath program 104 may manage, by using the disk object, the plurality of paths used for accessing the disk, for example, discover a new path, delete a broken path, and select, according to a preset policy, a path used for delivering an I/O request.

For example, if the multipath program 104 first receives, on a path 1, a disk identifier of a logical disk whose disk code is a namespace 1, the multipath program 104 creates a disk object for the namespace 1, allocates a disk object name sda to the disk object, establishes a mapping relationship between the disk object name sda and the disk identifier, and records the path 1 as a first path of the disk object. If the multipath program 104 further receives the disk identifier of the namespace 1 on a path 2 and a path 3 subsequently, the multipath program 104 also records the path 2 and the path 3 as paths of the disk object. For example, in this embodiment, after the multipath program receives 2N disk identifiers namespace 1 on 2N paths, and combines paths of a same control node, the multipath program manages N paths between the host and the storage system.

Step S508: After creating an access path for the logical disk, the multipath program 104 sends a path state query command to the storage system 300, where the state query command is used to instruct each control node to report a path state of a path corresponding to the control node.

In this embodiment, the host 100 and the storage system 300 communicate with each other by using the NVMeoF protocol. The host first generates a non-volatile memory express (NVMe) path state query command, and then encapsulates the NVMe interval query command into the external network protocol to obtain an external network protocol interval query command. In this step, the sent path state query command is the external network protocol interval query command.

The NVMe state query command is a command defined in the existing NVMe protocol. The NVMe state query command is a command defined according to a Get Log Page command Dword 10 in the NVMe protocol. The NVMe state query command is shown in FIG. 6. A command identifier OCh of the path state query command is added to a log page identifier (LID) field, and the LID field is at a byte 07:00 of the path state query command. Other fields in the command are unrelated to this embodiment of the present disclosure, and are not specifically described herein. Only a field related to this embodiment of the present disclosure is described in the following descriptions.

In this embodiment, the external network protocol may be a fibre channel (FC), an InfiniBand technology, RDMA over Converged Ethernet (RoCe), RDMA over TCP (iWARP), Peripheral Component Interconnect Express (PCIe), or another network protocol.

Step S509: A control node that receives the path state query command obtains the path state, adds the path state to state reporting information, and reports the state reporting information to the multipath program 104 of the host.

Because the path state query command is the external network protocol interval query command, after receiving the path state query command, the control node that receives the path state query command first parses the path state query command to obtain the NVMe state query command, and then queries, according to an instruction of the NVMe state query command, a path state of a path corresponding to the control node that receives the path state query command.

In the NVMeoF protocol, several path states are predefined. As shown in FIG. 8, path states indicated by state codes 01h to 04h are path states defined in the existing protocol. The state code 01h indicates an optimized state (namely, an ANA Optimized State). After receiving state reporting information including the state code 01h, the host 100 sets, to an optimized path, a path used for reporting the state reporting information. The state code 02h indicates a non-optimized state (namely, an ANA Non-Optimized State). After receiving state reporting information including the code 02h, the host 100 sets, to a non-optimized path, a path used for reporting the state reporting information. The state code 03h indicates an inaccessible state (namely, an ANA inaccessible State). After receiving state reporting information including the state code 03h, the host 100 sets, to an inaccessible path, a path used for reporting the state reporting information. The state code 04h indicates a persistent loss state (namely, an ANA Persistent Loss State). After receiving state reporting information including the state code 04h, the host 100 sets, to a failure path, a path used for reporting the state reporting information.

A space-dependent state (ANA LBA-Dependent State) indicated by a state code 05h is a newly added state in this embodiment of the present disclosure. The space-dependent state indicates that the logical disk 303 is divided into a plurality of access intervals. After receiving state reporting information including the state code 05h, the host 100 obtains an access interval corresponding to a control node that reports this state. A specific obtaining manner is described in detail in the following descriptions.

The control node that receives the path state query command obtains the path state in the following manner: determining whether the logical disk 303 is divided into a plurality of access intervals; and when the logical disk 303 is not divided into a plurality of access intervals, obtaining the path state of the path corresponding to the control node. In the storage system, a state of each path is identified in advance. For example, an optimized path and a non-optimized path that are used for accessing the logical disk 303 are preset, and an inaccessible path and a failure path that are identified in advance are also identified. When the logical disk 303 is divided into a plurality of access intervals, it may be determined that the path state is the space-dependent state. After obtaining the path state, the control node that receives the path state query command reports a state code of each path state to the host 100 by using state reporting information shown in FIG. 7.

After the path state is determined, response information of the NVMe state query command is generated. FIG. 7 shows a format of the response information of the NVMe state query command in the existing NVMeoF protocol. The response information includes a disk quantity field, used to carry a quantity of logical disks accessible to the host 100. The quantity is added to a byte 07:04 of the reporting information. In this embodiment, only one logical disk is used as an example for description, and therefore 1 is filled in herein. The state reporting information further includes a path state field, used to carry the path state. The path state is added to a byte 16 of the reporting information. When the logical disk 303 is not divided into a plurality of access intervals, one of the codes 01h to 04h indicating the path states is filled in the byte 16. For example, if the path state of the path corresponding to the control node is an optimized state, the control node may add the state code 01h corresponding to the optimized state to the byte 16. When the logical disk 303 is divided into a plurality of access intervals, as shown in FIG. 9, the code 05h indicating the space-dependent state is added to the byte 16 of the state reporting information.

The generated response information of the NVMe state query command is encapsulated into the external network protocol to obtain an external network protocol state response message, and the external network protocol state response message is used as the reporting information and is reported to the host.

Step S510: After receiving the reporting information, the multipath program 104 of the host determines whether the path state in the reporting information indicates that the logical disk 303 includes a plurality of access intervals.

After receiving the reporting information, the multipath program 104 of the host parses the reporting information to obtain the response information that is of the NVMe state query command and that is encapsulated into the reporting information, and then obtains, from the response information, a state code indicating the path state. If the state code is 05h, the multipath program 104 determines that the logical disk 303 includes a plurality of access intervals. If the state code is one of 01h to 04h, the multipath program 104 determines that the logical disk is not divided into a plurality of access intervals.

Step S511: When determining that the logical disk is not divided into a plurality of access intervals, the multipath program records a state code as the path state of the path used for reporting the state reporting information, for reference by the multipath program 104 during I/O path selection.

Step S512: When determining that the logical disk is divided into a plurality of access intervals, the multipath program 104 sends an interval query command to the storage system 300, where the interval query command is used to instruct each control node in the storage system to report an access interval allocated to the control node.

Before sending the interval query command, the multipath program first generates an NVMe interval query command. The NVMe interval query command is also a command defined according to the Get Log Page command Dword 10 in the NVMe protocol. However, there is no NVMe interval query command in the existing NVMe protocol. The NVMe interval query command is a command newly defined according to the Get Log Page command Dword 10. The interval query command is a sub-command newly added to the NVMeoF protocol. As shown in FIG. 10, a command format of the NVMe interval query command is the same as the format of the NVMe state query command. A difference lies in that an LID field of the interval query command carries a command identifier of the NVMe interval query command, for example, 0Dh. After the NVMe interval query command is generated, the NVMe interval query command may be encapsulated into the external network protocol to obtain an external network protocol interval query command. The external network protocol interval query command is the interval query command.

In the storage system 300, response information of the NVMe interval query command is defined for the NVMe interval query command. As shown in FIG. 11, a namespace identifier field of the response information of the NVMe interval query command is used to carry a disk code of a logical disk, for example, a namespace 1. At a byte 03:00 of the response information, an access interval quantity field of the response information of the NVMe interval query command is used to carry a quantity of access intervals carried by the interval reporting information. At a byte 11:08 of the response information, because each control node accesses only one logical disk in this embodiment of the present disclosure, there is one access interval. In other embodiments, the host 100 may access another logical disk in addition to the logical disk 303 by using the control node, and therefore the quantity of access intervals filled in herein may not be 1. The response information of the NVMe interval query command further includes an interval description field. The interval description field is used to carry access interval information of an access interval. The interval description field is at a byte 27:12 of the response information, for example, a user data segment descriptor 1. When the interval reporting information carries a plurality of access intervals, a plurality of access interval description fields may be added to the response information. For example, information about the access intervals is sequentially filled in a byte following a byte 27:12. Descriptions of the access intervals are shown in FIG. 12 and FIG. 13.

Referring to FIG. 3*a* and FIG. 3*b*, there are two manners for obtaining an access interval through division: a division manner for a contiguous address space shown in FIG. 3*a*, and a division manner for a non-contiguous address space shown in FIG. 3*b*.

Figures 13, 14:
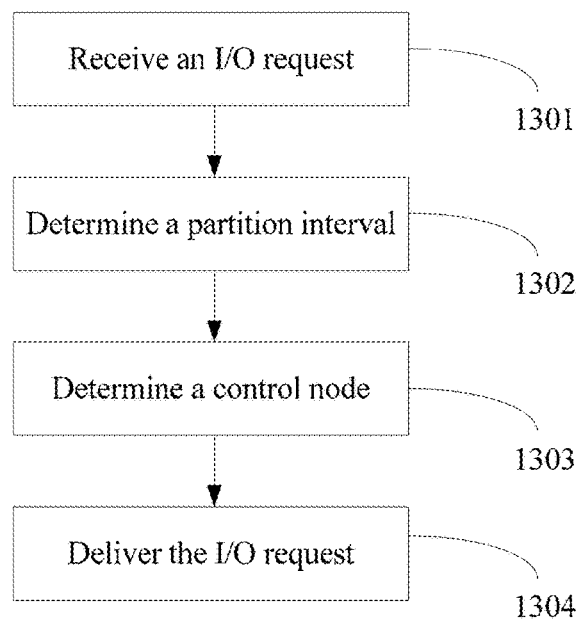

If the division manner for a contiguous address space is used for an access interval, as shown in FIG. 13, the access interval description information includes an access interval starting address field, used to carry an access interval starting address. For example, at a byte 07:00 of the access interval description information, an interval length field is further included, and is used to carry an access interval length. For example, at the byte 07:00 of the interval description information, because address spaces are contiguous, there is no access sub-interval, and a byte 15:12 carrying an access sub-interval spacing is 0. If the division manner for a non-contiguous address space is used for an access interval, addresses of access intervals are non-contiguous, the byte 07:00 represents a starting address of a $1^{st}$ access sub-interval, a byte 11:08 represents a length of each access sub-interval, and a byte 15:12 represents a spacing between two adjacent access sub-intervals.

Step S513: Each control node in the storage system receives the interval query command, then generates interval reporting information, and reports the interval reporting information to the host 100.

When receiving the interval query command, a control node that receives the query command parses the interval query command to obtain the NVMe interval query command, adds, based on the predefined format of the response information of the NVMe interval query command, an access interval of the control node that receives the query command to the response information of the NVMe interval query command, encapsulates the response information of the NVMe interval query command into the external network protocol to form the external network protocol interval response message, and uses the external network protocol interval response message as the interval reporting information for reporting to the host 100.

Step S514: After receiving the interval reporting information, the multipath program 104 of the host obtains access interval information from the interval reporting information, then records access interval information corresponding to the control node that reports the interval reporting information, and in this case may allocate an I/O request based on the information when receiving the I/O request.

When obtaining the access interval information, the multipath program 104 of the host first parses the interval reporting information to obtain the response information of the NVMe interval query command, and then obtains the access interval information from the response information of the NVMe interval query command.

FIG. 14 is a flowchart of allocating, when a host 100 receives an I/O request, a control node for executing the I/O request.

Step 1301: The host 100 receives an I/O request, where the I/O request carries a logical address of to-be-accessed data.

Step 1302: The host 100 determines an access interval corresponding to the logical address.

Step 1303: The host 100 determines, based on the determined access interval, a control node that processes the I/O request.

Step 1304: The host 100 delivers the I/O request to the control node, and the control node processes the I/O request.

In this way, the I/O request delivered by the host may be processed by the control node corresponding to the access interval corresponding to the logical address of the to-be-accessed data, to prevent I/O requests carrying a same logical address from being delivered to different control nodes for processing, and to avoid forwarding of the I/O request, thereby reducing a delay of the I/O request.

Figure 15:
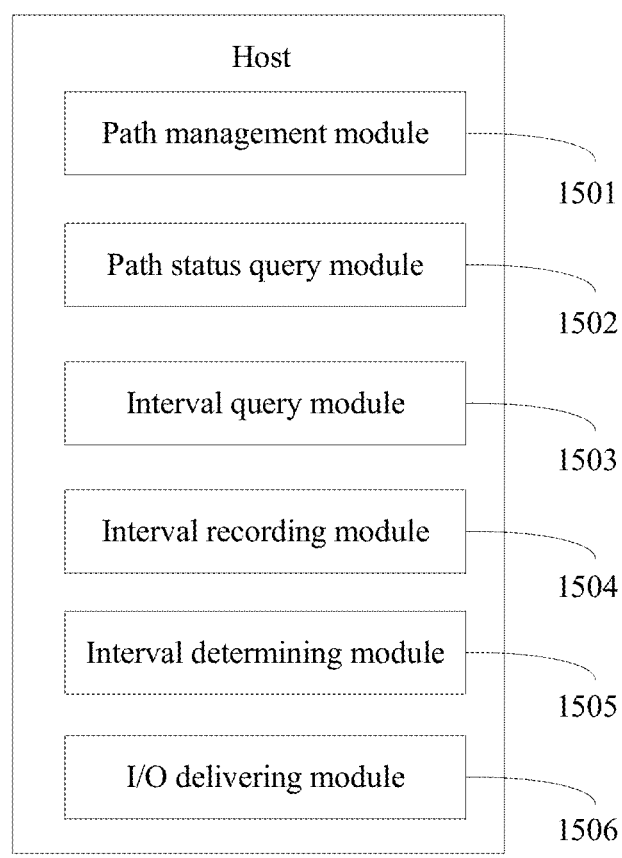
FIG. 15 is a modular diagram of a host according to an embodiment of the present disclosure.
Figure 16:
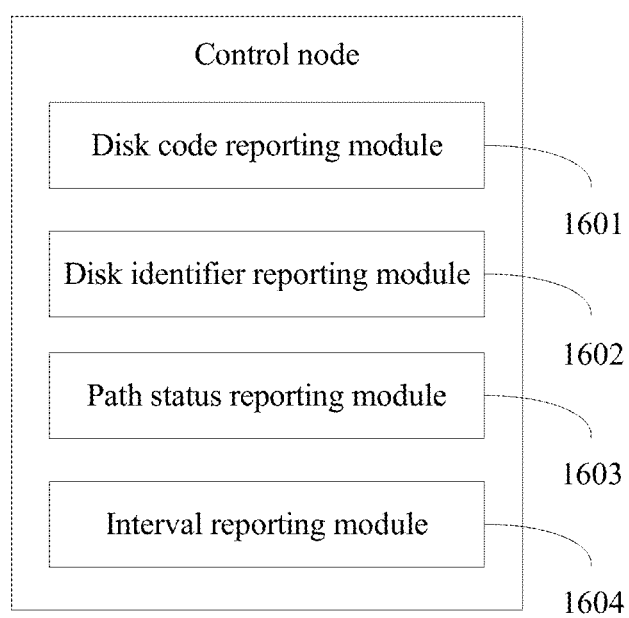
FIG. 16 is a modular diagram of any control node in a storage system according to an embodiment of the present disclosure.

FIG. 15 and FIG. 16 are respectively a modular diagram of a host and a modular diagram of any control node in a storage system according to an embodiment of the present disclosure. The host includes a path management module 1501, a path state query module 1502, an interval query module 1503, an interval recording module 1504, an interval determining module 1505, and an I/O delivering module 1506. The control node includes a disk code reporting module 1601, a disk identifier reporting module 1602, a path state reporting module 1603, and an interval reporting module 1604.

The path management module 1501 of the host 100 is configured to: when an operating system 105 of the host 100 detects that the storage system 300 is connected to the host 100, send a disk reporting command to the storage system 300 by using each of a plurality of paths between the host 100 and the storage system 300.

After receiving the disk reporting command, the disk code reporting module 1601 of the control node in the storage system 300 obtains a host port identifier in the disk reporting command; determines, based on the host port identifier and a mapping relationship between a host port identifier and a disk code of a logical disk, a disk code corresponding to the host port identifier; then generates reporting information for a logical disk corresponding to the disk code; adds the disk code to the reporting information; and reports the reporting information to the host 100.

After receiving reporting information reported by each control node 302 in the storage system 300, the path management module 1501 of the host sends a disk identifier query command by using a path indicated by path information in each piece of reporting information. The query command includes a disk code in the reporting information.

After receiving the query command, the disk identifier reporting module 1602 of the control node in the storage system 300 obtains, based on the disk code in the query command, a disk identifier corresponding to the disk code, and reports the disk identifier corresponding to the disk code by using the path used for sending the query command.

The path management module 1501 of the host determines, based on the reported disk identifier, a path used for accessing the logical disk corresponding to the disk identifier, and manages the determined path.

Figure 5:
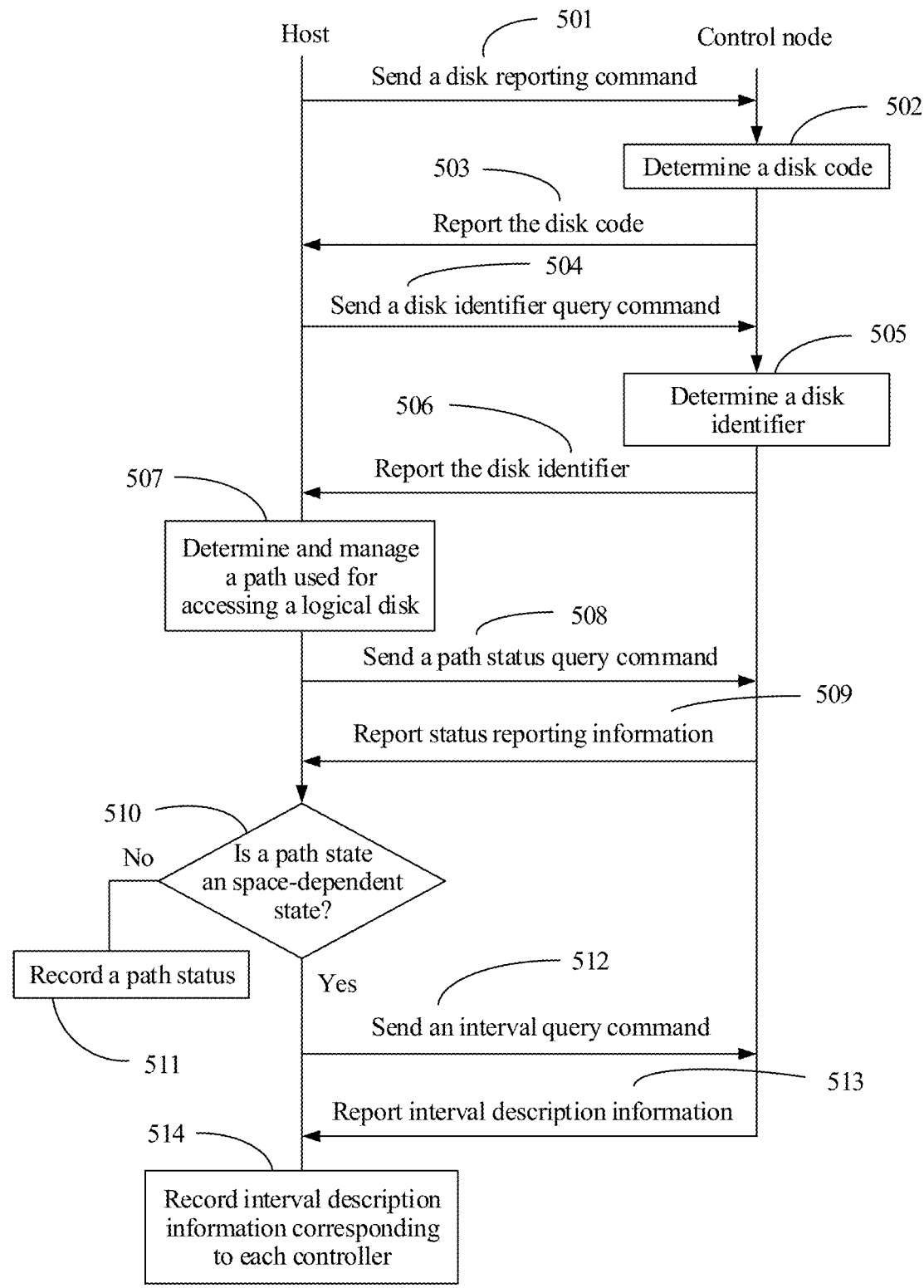
FIG. 5 is a flowchart of a method for managing a plurality of paths used for accessing a logical disk according to an embodiment of the present disclosure.

Functions executed by the path management module 1501 of the host are the same as functions executed in steps S501, S504, and S507 in FIG. 5. Functions executed by the disk code reporting module 1601 of the control node are the same as functions executed in steps S502 and S503 in FIG. 5, and functions executed by the disk identifier reporting module 1602 of the control node are the same as functions executed in steps S505 and S507 in FIG. 5. For details, refer to descriptions of corresponding steps in FIG. 5.

After the access path is created for the logical disk, the path state query module 1502 of the host sends a path state query command to the storage system 300. The state query command is used to instruct each control node to report a path state of a path corresponding to the control node. A function executed by the path state query module 1502 is the same as a function executed in step S508. For specific implementation details of the path state query module 1502, refer to related descriptions of step S508.

When receiving the path state query command, the path state reporting module 1603 of the control node adds the path state to state reporting information to report the state reporting information to the host. For specific implementation details of the path state reporting module 1603, refer to related descriptions of step S509.

After receiving the reporting information, the interval query module 1503 of the host determines whether the path state in the reporting information indicates that the logical disk 303 includes a plurality of access intervals. When determining that the logical disk is not divided into a plurality of access intervals, the interval query module 1503 records a state code as a path state of a path used for reporting the state reporting information, for reference by the multipath program 104 during I/O path selection. When determining that the logical disk is divided into a plurality of access intervals, the interval query module 1503 sends an interval query command to the storage system 300. The interval query command is used to instruct each control node in the storage system to report an access interval allocated to the control node. For specific implementation details of the interval query module 1503, refer to related descriptions of steps S510 to S512.

The interval reporting module 1604 of the control node receives the interval query command, then generates interval reporting information, and reports the interval reporting information to the host 100. For specific implementation details of the interval reporting module 1604, refer to related descriptions of step S513.

After receiving the interval reporting information, the interval recording module 1504 of the host obtains access interval information from the interval reporting information, then records access interval information corresponding to the control node that reports the interval reporting information, and in this case may allocate an I/O request based on the information when receiving the I/O request.

The interval determining module 1505 of the host is configured to: receive an I/O request, where the I/O request carries a logical address of to-be-accessed data, and determine an access interval corresponding to the logical address.

The I/O delivering module 1506 is configured to determine, based on the determined access interval, a control node that processes the I/O request, and then delivers the I/O request to the control node, and the control node processes the I/O request.

The foregoing descriptions are only example implementations in accordance with the present disclosure, and thus are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A data processing method, wherein the method is performed by a host communicating with a storage system through a Non-Volatile Memory express over Fabric (NVMeoF) protocol, the host accessing a logical disk of the storage system through a control node in the storage system, and the method comprises:

sending a state query command to the control node, wherein the state query command is configured to instruct the control node to report a path state of a path corresponding to the control node;

receiving the path state reported by the control node;

when the received path state indicates that the logical disk comprises an access interval, sending an interval query command to the control node;

receiving access interval information reported by the control node, wherein an access interval indicated by the access interval information is pre-allocated to the control node; and recording a mapping relationship between the control node and the access interval information.

2. The method according to claim 1, wherein the method further comprises:

receiving an I/O request, wherein the I/O request carries a logical address of to-be-accessed data;

determining an access interval corresponding to the logical address;

determining, based on the mapping relationship, a control node corresponding to the access interval; and sending the I/O request to the control node corresponding to the access interval.

3. The method according to claim 1, wherein the access interval query command is defined according to a command of "Get Log Page command Dword 10" in the NVMeoF protocol, and a command identifier of the access interval query command is added to a log page identifier field of the command.

4. The method according to claim 1, wherein the access interval indicated by the access interval information is a contiguous address space.

5. The method according to claim 1, wherein the access interval corresponding to the control node comprises a first access sub-interval and a second access sub-interval, and there is a spacing between the first access sub-interval and the second access sub-interval.

6. The method according to claim 1, wherein the host and the storage system communicate with each other through an external network and sending an interval query command to the control node comprises:

encapsulating the interval query command into an external network protocol to obtain an external network protocol interval query command, wherein the access interval belongs to a namespace of the storage system; and sending the external network protocol interval query command to the control node; and, wherein receiving the access interval information reported by the control node comprises:

receiving an external network protocol interval response message sent by the control node, wherein the external network protocol interval response message comprises a response to the interval query command, and the response to the interval query command comprises access interval information of the namespace;

parsing the external network protocol interval response message to obtain response information of the interval query command; and obtaining, from the response to the interval query command, access interval information of the control node and recording the access interval information.

7. The method according to claim 6, wherein sending the state query command to the control node comprises:

encapsulating the state query command into the external network protocol to obtain an external network protocol state query command; and sending the external network protocol state query command to the control node; and, wherein receiving the path state reported by the control node comprising:

receiving an external network protocol state response message sent by the control node, wherein the external network protocol state response message comprises a response to the state query command, the response to the state query command comprises path state information; and parsing the external network protocol state response message to obtain path state information comprised in the state query command.

8. A data processing method, wherein the method is performed by a control node in a storage system, the storage system and a host communicate with each other by using the NVMeoF (Non-Volatile Memory express over Fabric) protocol, the storage system comprises a logical disk, and the method comprises:

receiving a state query command sent by the host, wherein the state query command is configured to instruct the control node to report a path state of a path corresponding to the control node;

when the logical disk comprises an access interval, reporting, to the host, a path state indicating that the logical disk comprises the access interval;

receiving an access interval query command sent by the host based on the path state; and reporting, to the host based on the access interval query command, access interval information of an access interval allocated to the control node to facilitate the host to record a mapping relationship between the access interval information and the control node.

9. The method according to claim 8, wherein the access interval query command is defined according to a command of "Get Log Page command Dword 10" in the NVMeoF protocol, and a command identifier of the access interval query command is added to a log page identifier field of the command.

10. The method according to claim 8, wherein the access interval indicated by the access interval information is a contiguous address space.

11. The method according to claim 8, wherein the access interval corresponding to the control node comprises a first access sub-interval and a second access sub-interval, and there is a spacing between the first access sub-interval and the second access sub-interval.

12. The method according to claim 8, wherein the host and a storage system communicate with each other through an external network and the reporting access interval information of an access interval allocated to the control node comprises:
    receiving an external network protocol interval query command sent by the host, and parsing the external network protocol interval query command to obtain the interval query command;
    generating response information of the interval query command, wherein the response information of the interval query command comprises access interval information corresponding to the control node;
    encapsulating the response information of the interval query command into the external network protocol to obtain an external network protocol interval response message; and
    reporting the external network protocol interval response message to the host.

13. The method according to claim 12, wherein before receiving the external network protocol interval response message sent by the control node, the method further comprises:
    receiving an external network protocol state query command, and parsing the external network protocol state query command to obtain the state query command;
    generating response information of the NVMe state query command, and when a namespace comprises an access interval, adding a path state indicating that the namespace comprises the access interval to the response information of the state query command; and
    encapsulating the state query command to obtain response information of the external network protocol state query command, and reporting the response information of the external network protocol state query command to the host.

14. A host, communicating with a storage system by using a Non-Volatile Memory express over Fabric (NVMeoF) protocol, the host accesses a logical disk of storage system through a control node in the storage system, and the host comprises:
    a memory storing instructions; and
    a processor coupled to the memory to execute the instructions to:
    send a state query command to the control node, wherein the state query command is configured to instruct the control node to report a path state of a path corresponding to the control node;
    receive the path state reported by the control node;
    send an interval query command to the control node when the received path state indicates that the logical disk comprises an access interval;
    receive access interval information reported by the control node, wherein an access interval indicated by the access interval information is pre-allocated to the control node; and
    record a mapping relationship between the control node and the access interval information.

15. The host according to claim 14, wherein the processor is future configured to:
    receive an I/O request, wherein the I/O request carries a logical address of to-be-accessed data;
    determine an access interval corresponding to the logical address;
    determine, based on the mapping relationship, a control node corresponding to the access interval; and
    send the I/O request to the control node corresponding to the access interval.

16. The host according to claim 14, wherein the access interval query command is defined according to a command of "Get Log Page command Dword 10" in the NVMeoF protocol, and a command identifier of the access interval query command is added to a log page identifier field of the command.

17. The host according to claim 14, wherein the access interval indicated by the access interval information is a contiguous address space.

18. The host according to claim 14, wherein the access interval corresponding to the control node comprises a first access sub-interval and a second access sub-interval, and there is a spacing between the first access sub-interval and the second access sub-interval.

19. The host according to claim 14, wherein the host and the storage system communicate with each other through an external network and sending an interval query command to the control node, and the processor is further configured to:
    encapsulate the interval query command into an external network protocol to obtain an external network protocol interval query command, wherein the access interval belongs to a namespace of the storage system; and
    send the external network protocol interval query command to the control node;
    receive an external network protocol interval response message sent by the control node, wherein the external network protocol interval response message comprises a response to the interval query command, and the response to the interval query command comprises access interval information of the namespace; and
    parse the external network protocol interval response message to obtain response information of the interval query command; and
    obtain, from the response to the interval query command, access interval information of the control node and recording the access interval information.

20. The host according to claim 19, wherein the processor is further configured to:
    encapsulate the state query command into the external network protocol to obtain an external network protocol state query command;
    send the external network protocol state query command to the control node;
    receive an external network protocol state response message sent by the control node, wherein the external network protocol state response message comprises a response to the state query command, the response to the state query command comprises path state information; and
    parse the external network protocol state response message to obtain path state information comprised in the state query command.

21. A control node in a storage system, the storage system and a host communicate with each other by using a Non-Volatile Memory express over Fabric (NVMeoF) protocol, and the control node comprises:
    a memory storing instructions; and
    a processor coupled to the memory to execute the instructions to:

receive a state query command sent by the host, wherein the state query command is used to instruct the control node to report a path state of a path corresponding to the control node;

report, to the host, a path state indicating that the logical disk comprises the access interval;

receive an access interval query command sent by the host based on the path state; and report, to the host based on the access interval query command, access interval information of an access interval allocated to the control node.

22. The control node according to claim 21, wherein the access interval query command is defined according to a command of "Get Log Page command Dword 10" in the NVMeoF protocol, and a command identifier of the access interval query command is added to a log page identifier field of the command.

23. The control node according to claim 21, wherein the access interval indicated by the access interval information is a contiguous address space.

24. The control node according to claim 22, wherein the access interval corresponding to the control node comprises a first access sub-interval and a second access sub-interval, and there is a spacing between the first access sub-interval and the second access sub-interval.

25. The control node according to claim 21, wherein the host and a storage system communicate with each other by using an external network and the processor is further configured to:

receive an external network protocol interval query command sent by the host, and parsing the external network protocol interval query command to obtain the interval query command;

generate response information of the interval query command, wherein the response information of the interval query command comprises access interval information corresponding to the control node;

encapsulate the response information of the interval query command into the external network protocol to obtain an external network protocol interval response message; and report the external network protocol interval response message to the host.

26. The control node according to claim 25, wherein the processor is further configured to:

receive an external network protocol state query command, and parsing the external network protocol state query command to obtain the state query command;

generate response information of the NVMe state query command, and when a namespace comprises an access interval, adding a path state indicating that the namespace comprises the access interval to the response information of the state query command; and encapsulate state query command to obtain response information of the external network protocol state query command, and reporting the response information of the external network protocol state query command to the host.

* * * * *